J. B. DAVIS.
REGISTERING APPARATUS.
APPLICATION FILED MAR. 6, 1916.

1,275,865.

Patented Aug. 13, 1918.
3 SHEETS—SHEET 1.

WITNESSES:
H. E. Hartwell.

INVENTOR.
John B. Davis,
BY Chapin + Neal
ATTORNEYS.

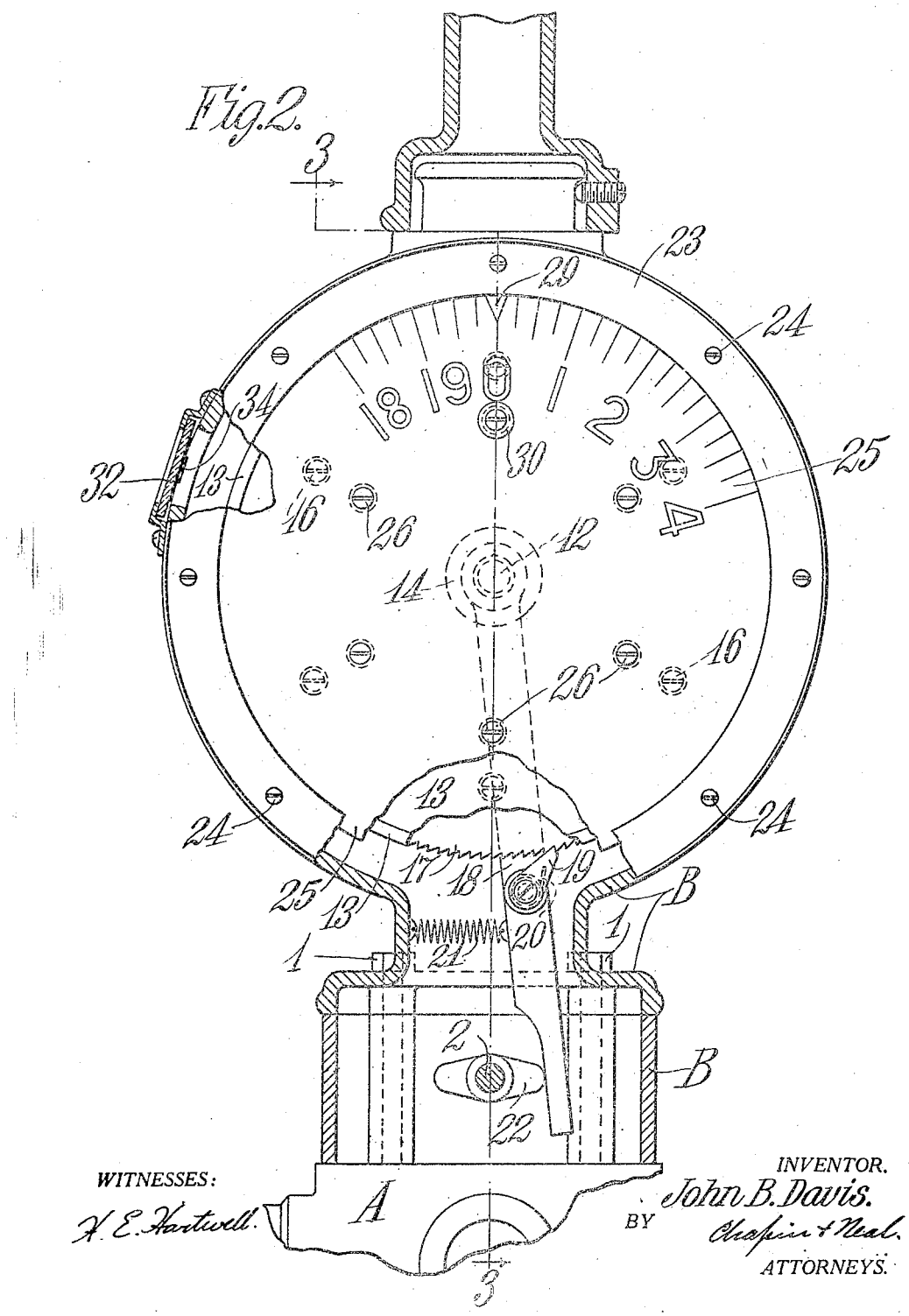

J. B. DAVIS.
REGISTERING APPARATUS.
APPLICATION FILED MAR. 6, 1916.
1,275,865.
Patented Aug. 13, 1918.
3 SHEETS—SHEET 3.
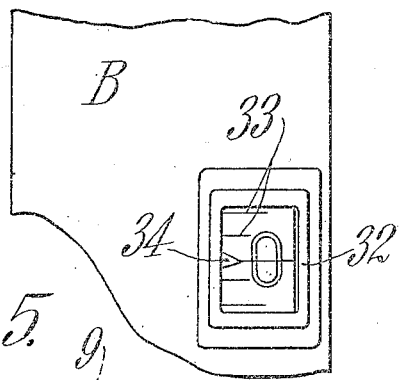
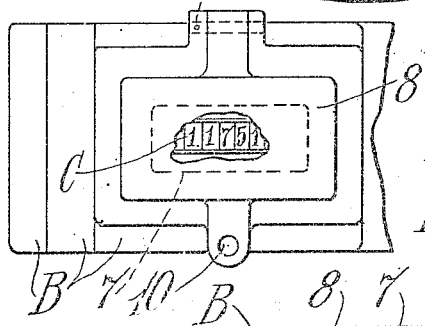
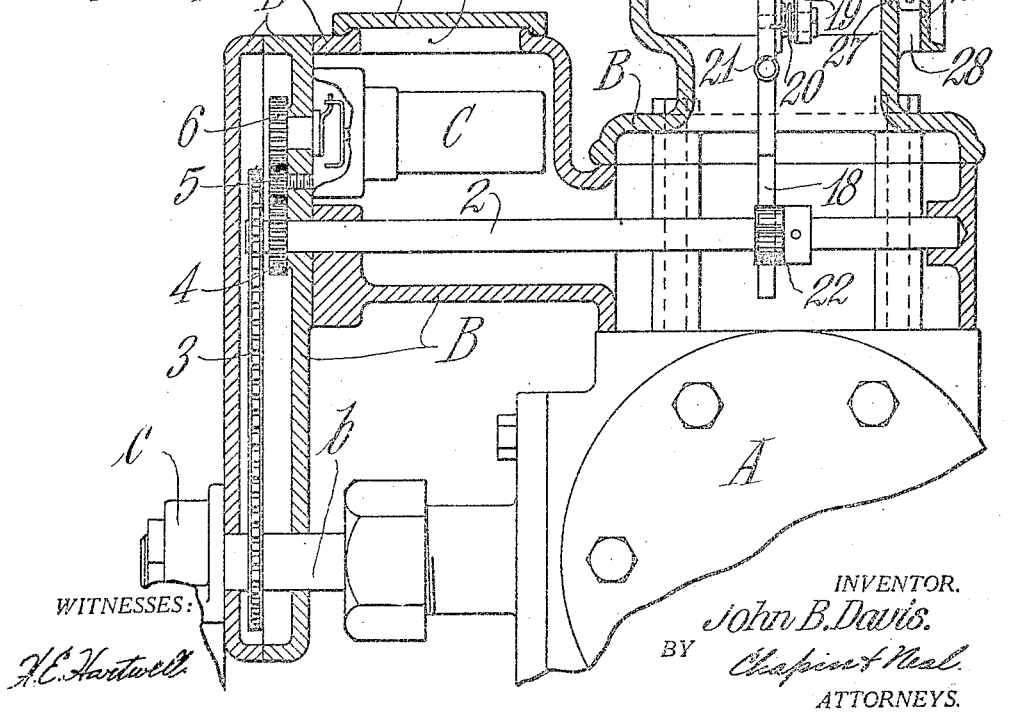
INVENTOR.
John B. Davis.
BY
Chapin & Neal
ATTORNEYS.
WITNESSES:
H. E. Hartwell

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

REGISTERING APPARATUS.

1,275,865.

Specification of Letters Patent. Patented Aug. 13, 1918.

Application filed March 6, 1916. Serial No. 82,458.

*To all whom it may concern:*

Be it known that I, JOHN B. DAVIS, a citizen of the United States of America, residing at Springfield, in the county of Hampden and State of Massachusetts, have invented certain new and useful Improvements in Registering Apparatus, of which the following is a specification.

This invention relates to counting apparatus for rotary or crank operated mechanism and, while the invention is capable of general application, it is particularly designed for use with a rotary pump of the type disclosed in my copending application, Serial No. 61,397, filed November 13, 1915.

An object of the invention is to provide apparatus of the class described, which may be applied to mechanism operable by continuous rotation in one direction, to indicate periodically the extent of rotative movement, said apparatus comprising an indicating means rotatable in one direction only, and devices operable at periodic intervals in the rotation of said mechanism to move the indicating means step by step together with a device to hold said means in its moved position, said apparatus being characterized by generally simplified and improved structure and by an improved arrangement of parts.

For the purpose of illustrating one way in which the invention may be practised, one preferred embodiment thereof is shown in the accompanying drawings, in which—

Fig. 2 is a front elevational view of a portion of Fig. 1, certain portions being in section to reveal interior mechanism;

Fig. 3 is a cross-sectional view taken on the line 3—3 of Fig. 2 and looking in the direction of the arrows;

Fig. 4 is a fragmentary view showing the side indicator; and

Fig. 5 is a plan view of a portion of Fig. 3.

Figure 1:
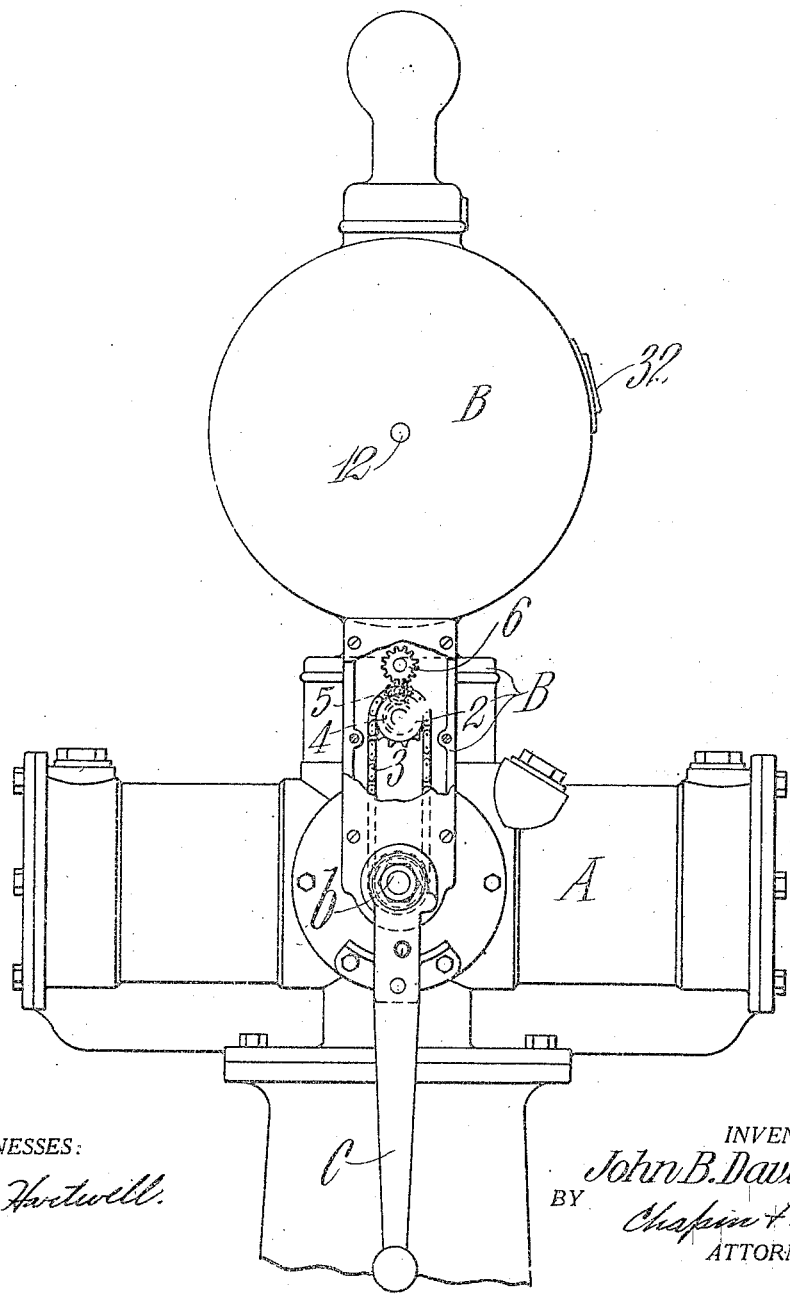
Figure 1 is a rear elevational view of the counting apparatus shown as applied to a rotary pump.

For the purposes of illustration, the counting apparatus is shown as applied to a dispensing pump of the type disclosed in my above-mentioned application. A represents the pump casing, $b$ the drive shaft, and $c$ the operating handle for the pump. The latter, as disclosed in the above noted application, is adapted to be turned continuously in one direction and to deliver a definite measured quantity for each revolution, such as a half-gallon, for example.

B represents the casing of the counting apparatus, which is preferably made in several parts as shown, and secured to the top of casing A by bolts 1. Mounted in casing B above and in parallel relation to shaft $b$ is a shaft 2, which is driven from and at the same speed as the former by a chain 3 and suitable sprockets. Fixed to shaft 2 is a gear 4 which drives by an intermediate gear 5 a gear 6 (Figs. 1 and 3). The latter is adapted to drive a register C, the indications of which are cumulative and show the total number of revolutions of shaft $b$. This register is indicated in conventional form only, since its construction is generally well understood in the art. Register C is purposely placed within the casing B so that it will not be visible to the public generally, and it is desirable to so locate the register since, otherwise, it would be easy to find out the extent of one's business by inspection of the register. The indications of register C are visible through an opening 7 formed in casing B, and this opening is normally closed by a cover 8 which is pivoted at 9 to casing B and has an eye 10 adapted to receive a padlock whereby the cover may be locked to casing B (Figs. 3 and 5).

Fixed in casing B above and in parallel relation to shaft 2 is a stud 12 and loosely mounted on the latter is a circular frame 13, which is held axially on the stud by collars 14 and 15. A spring 11 (Fig. 3) is arranged between collar 14 and frame 13 to constantly force the latter against collar 15 to present a frictional resistance to movements of the frame. Secured to the inner face of frame 13 by screws 16 is a ratchet wheel 17. A lever 18 loosely mounted on stud 12 between the collar 14 and frame B bears a pawl 19 which is held in engagement with ratchet 17 by a spring 20, as shown in Figs. 2 and 3. Lever 18 extends downwardly below and to one side of shaft 2 already described, and a spring 21 (Fig. 2) tends to pull the lever toward shaft 2. Fixed to the latter is a cam 22 which has two oppositely disposed projecting arms arranged in the path of lever 18, whereby ratchet 17 may be moved a definite increment every half revolution of shaft 2 and thus shaft $b$.

The upper portion of casing B is circular in shape and is formed with a closed rear face and an open front face as clearly shown in Fig. 3. An annular rim 23 is secured to the casing B by screws 24 to surround the opening therein and present a finished appearance to the casing. Movable closely adjacent rim 23 is a dial 25 which is fastened by screws 26 to the outer face of frame 13. The dial 25 is slightly larger in diameter than the opening in rim 23 so that it overlaps the latter, as shown in Figs. 2 and 3. In back of dial 25 and closely adjacent thereto is an annular rim 27 which is overlapped by the dial, as best shown in Fig. 3. No glass is provided to protect dial 25, but rain beating in on the face of the dial is prevented from passing into the casing by rim 27. An annular pocket is thus formed between rims 23 and 27 to receive the water, and this pocket has an opening 28 in its lower portion to permit the water entering in the pocket to drain therefrom, as shown in Fig. 3.

Secured to the upper portion of casing B and between the latter and rim 23 is a pointer 29 (Figs. 2 and 3) which is closely adjacent the dial 25. The latter is graduated, as shown in Fig. 2, in suitable units, such as gallons, for example. The pump, shown in Fig. 1, is arranged to deliver one-half gallon for each revolution of shaft $b$, and, since shaft 2 is driven from the latter at equal speed, the ratchet 17 will be moved twice during each revolution of shaft $b$. Each movement of ratchet 17 will thus move dial 25 in a counterclockwise direction a distance equal to one quarter of a gallon as indicated by the smallest scale divisions on the dial. The latter is arranged to be visible and easily read from the street side of the pump and obviously is not visible to the operator. To permit the latter to read the quantities dispensed by the pump, a window 32 is provided at a convenient point in the periphery of casing B, as shown in Figs. 1, 2, and 4. The periphery of frame 13 is graduated similarly to dial 25, as shown at 33 in Fig. 3, and these graduations are readily visible through window 32 and may be read with reference to a pointer 34 (see Fig. 4) suitably secured to frame B. A handle 30 (Figs. 2 and 3) is secured to dial 25 so that the latter may be turned manually when necessary as will later appear.

In operation, as crank $c$ is turned, shafts $b$ and 2 rotate at equal speeds. Register C is likewise rotated from and at the same speed as shaft 2. At periodic intervals in each rotation of shaft 2 (in the embodiment shown every half revolution) lever 18 is actuated by cam 22 to move ratchet 17 and thus dial 25 a definite increment. Dial 25 thus rotates counterclockwise in step by step movements to bring the graduations successively in under pointer 29, whereby the number of revolutions of shaft $b$ may be indicated. In the embodiment shown, dial 25 is graduated in gallons and fractions thereof, since one revolution of shaft $b$ is arranged to cause a delivery of one-half gallon, so that two revolutions of shaft 2 are required to bring the unit graduations beneath pointer 29. The movements of shaft $b$ are likewise indicated to the operator through window 32, as already described. Spring 11 constantly acts against frame 13 so that as the dial is moved, it is held in its moved position against retrograde movements during the retraction of pawl 19 by frictional resistance. After the pump A is stopped, the dial may be reset to zero position by manually turning the dial by means of handle 30 in a counterclockwise direction.

The counting apparatus described is characterized by simplicity in structure and operation without detriment to its effectiveness and accuracy as an indicating means. The parts are relatively few and are each of simple character. All elaborate devices have been avoided, and the apparatus has been designed with the aim of providing a practical indicating apparatus which could be manufactured at relatively low cost without sacrifice to its utility. The apparatus is also distinguished by its arrangement and disposition of parts, whereby its indications may be conveniently observed by the customer and the operator without moving from their natural and accustomed positions, and whereby the cumulative indications on register C are effectively kept from public inspection.

It is recognized that changes may be made in the structure herein described for illustrative purposes without departing from the scope of the invention which is defined by the appended claims rather than by the foregoing description of a preferred form.

What I claim is—

1. In a counting apparatus, a substantially cylindrical casing having an open face and provided with spaced annular rims adjacent said face, a dial rotatably mounted within the casing to move between said rims and close said face, mechanism entirely within the casing and rendered inaccessible by said dial to move the latter, an indicator on the casing adjacent the dial, and means on the dial accessible from without the casing to reset said dial to zero position with relation to the pointer.

2. In a counting apparatus, a substantially circular casing having an open face, spaced annular rims projecting from the interior of said casing and disposed adjacent said open face, a dial rotatably mounted in the casing and movable between said spaced rims in overlapping relation thereto, whereby an annular pocket is formed to prevent the entrance of water into the casing, and an opening formed in the latter at the base of said pocket, whereby water entering therein may drain from the casing.

3. In a counting apparatus, a substantially cylindrical casing having an open end face and an opening formed in its periphery, a dial rotatably supported within the casing and arranged to close said face, graduations provided on the outer face and the periphery of said dial, indicators on the casing adjacent the face and periphery of the dial, whereby the indications of the latter may be observed, transparent means to entirely close said opening, a cumulative register housed within the casing, an opening in the latter to permit observation of the register, a cover to close said opening and prevent observation of the register except by authorized persons, means to lock the cover to the casing, and means entirely concealed within the casing and completely inaccessible from without the casing to operate said dial and register.

JOHN B. DAVIS.